(12) United States Patent
Cao et al.

(10) Patent No.: US 8,410,455 B2
(45) Date of Patent: Apr. 2, 2013

(54) EXCITATION-INTENSITY-DEPENDENT, COLOR-TUNABLE, DUAL EMITTING NANOCRYSTALS

(75) Inventors: Y. Charles Cao, Gainesville, FL (US); Ou Chen, Gainesville, FL (US); Daniel Edward Shelby, Gainesville, FL (US); Yongan Yang, Irvine, CA (US); Jiaqi Zhuang, Gainesville, FL (US); Nicolo Omenetto, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 471 days.

(21) Appl. No.: 12/755,820

(22) Filed: Apr. 7, 2010

(65) Prior Publication Data

US 2010/0264334 A1    Oct. 21, 2010

Related U.S. Application Data

(60) Provisional application No. 61/170,157, filed on Apr. 17, 2009.

(51) Int. Cl.
*G01N 21/64* (2006.01)

(52) U.S. Cl. .................................... 250/459.1
(58) Field of Classification Search ............... 250/459.1
See application file for complete search history.

(56) References Cited

U.S. PATENT DOCUMENTS

| 5,892,234 | A * | 4/1999 | McKeever et al. | 250/459.1 |
| 2005/0106257 | A1* | 5/2005 | Albayrak | 424/489 |
| 2005/0129947 | A1* | 6/2005 | Peng et al. | 428/403 |

OTHER PUBLICATIONS

Konishi et al., "Enhancement of photoluminescence of ZnS:Mn nanocrystals by hybridizing with polymerized acrylic acid," 2001, Journal of Luminescence, vol. 93, pp. 1-8.*
Yang et al., "Enhanced photoluminescence from Cd:SMn/ZnS core/shell quantum dots," 2003, Applied Physics Letters, vol. 82, No. 12, pp. 1965-1967.*
Yang, Y. et al., "Radial-Position-Controlled Doping in CdS/ZnS Core/Shell Nanocrystals," *J. Am. Chem. Soc.*, 2006, pp. 12428-12429, vol. 128.
Yang, Y. et al., "On Doping CdS/ZnS Core/Shell Nanocrystals with MN," *J. Am. Chem. Soc.*, 2008, pp. 15649-15661, vol. 130.
Yang, Y. et al., "Radial-Position-Controlled Doping of CdS/ZnS Core/Shell Nanocrystals: Surface Effects and Position-Dependent Properties," *Chem. Eur. J.*, 2009, pp. 3186-3197, vol. 15.

* cited by examiner

*Primary Examiner* — Kiho Kim
(74) *Attorney, Agent, or Firm* — Saliwanchik, Lloyd & Eisenschenk

(57) ABSTRACT

An embodiment of the invention is a device for photo-stimulated color emission having at least one plurally doped semiconducting nanoparticle comprising at least one semiconducting material and a plurality of at least one dopant coupled with an irradiation source such that the plurally doped semiconducting nanoparticle emit electromagnetic radiation at two or more wavelengths where the intensities of the emissions depend on the intensity of the irradiation. In an embodiment of the invention, the plurally doped semiconducting nanoparticle can be a doped core/shell nanoparticle where the plurality of dopants can reside in exclusively the core, exclusively the shell, or in both the core and shell.

16 Claims, 15 Drawing Sheets

EXCITATION-INTENSITY-DEPENDENT, COLOR-TUNABLE, DUAL EMITTING NANOCRYSTALS

CROSS-REFERENCE TO RELATED APPLICATION

The present application claims the benefit of U.S. Provisional Application Ser. No. 61/170,157, filed Apr. 17, 2009, which is hereby incorporated by reference herein in its entirety, including any figures, tables, or drawings.

The subject invention was made with government support under a research project supported by National Science Foundation, Contract Nos. DMR-0645520 and CHE-0822469, and the Office of Naval Research, Contract No. N00014-06-1-0911. The government has certain rights to this invention.

BACKGROUND OF INVENTION

Semiconductor nanocrystals are very small crystallites of semiconductor material, also known as quantum dots, which have the opto-electronic properties of semiconductors. They are typically prepared as colloids, and as such, display physico-chemical properties of molecules. One feature of semiconductor nanocrystals is that their color may be controlled by their size because of quantum confinement on their electronic states. The electron occupation of the nanocrystals can be controlled by n- and p-type doping as is common for bulk semiconductors.

For example, Mn-doped semiconductor nanocrystals exhibit unique optical and magneto-optical properties. Large Zeeman effects are observed in Mn-doped ZnS, ZnSe and CdSe nanocrystals, and the effects indicate that quantum-confined excitons feel a large effective magnetic field of up to 400 Tesla, induced by the presence of a few $Mn^{2+}$ ions inside the nanocrystals. Spin-polarizable excitonic photoluminescence (PL) is observed in Mn-doped CdSe nanocrystals. Additionally, Mn dopants can introduce new luminescence properties to nanocrystals. Mn-doped CdS/ZnS core/shell nanocrystals possess dopant-position-dependent PL properties. Mn dopants can be used as a radial pressure gauge to measure the lattice strains in the nanocrystals. Mn-doped CdS/ZnS core/shell nanocrystals display dual emission properties.

With respect to PL properties of Mn-doped nanocrystals, when a photon is absorbed by a Mn-doped nanocrystal, an electron-hole pair (i.e., exciton) is created and confined inside the nanocrystal. These doped nanocrystals have multiple modes of energy release and means for selectively or differentially addressing these modes of release, in principle allow the tuning of properties. Newly discovered optical properties of dual emitting doped semiconductor nanocrystals have the potential to expand the technologies that can be addressed by these compositions of matter. Such properties allow manipulation of the dual emitting doped nanocrystal's optical emission in a manner that can be readily and rapidly switched, unlike properties defined solely by their size, composition or doping level, which are effectively fixed upon preparation. Because of these properties, doped nanocrystal can be technologically exploited in fields including, displays, biomedical diagnosis, and in vivo biological imaging.

BRIEF SUMMARY

Embodiment of the invention are directed to devices for photo-stimulated color emission having at least one plurally doped semiconducting nanoparticle that comprises at least one semiconducting material and a plurality of at least one dopant coupled to an irradiation source. The emissions of electromagnetic radiation by the plurally doped semiconducting nanoparticles occur at a plurality of wavelengths where the intensities of the emissions at the wavelengths depend upon the intensity of the irradiation. In one embodiment of the invention, at least two semiconductor materials are segregated as two or more discontinuous materials forming, for example, a core and at least one shell. In various embodiments of the invention, the plurality of dopants: can reside in one or more of the shells and be excluded from the core; can reside in the core and be excluded from the shell; and can reside in the core and in one or more shell layers. Different dopants can reside in different discontinuous materials, for example a plurality of one dopant can reside in the core and a second dopant can reside in on of the shells. The plurality of each dopant can be two to about 15 dopants. The semiconductor can be a metal calcogenide or a metal pnictogenide. The dopants can be selected from Mn, Ni, Eu, Tb or other rare earth metals. The irradiation source can be a laser or a lamp. In embodiments of the invention, the surface of the nanoparticle can be modified with a surface functional moiety such as an organic dye. In embodiments of the invention, the nanoparticles can be embedded into a polymer matrix.

Another embodiment of the invention is directed to a method of emitting light by providing at least one plurally doped semiconducting nanoparticle comprising at least one semiconducting material and a plurality of at least one dopant and irradiating the nanoparticles with a controlled intensity of radiation such that the plurally doped semiconducting nanoparticles emit electromagnetic radiation at a plurality of wavelengths with an emission intensity at each wavelength that depends on the intensity of the irradiation intensity. Where the source of irradiation is a laser, the emissions can be determined by the fluency of the laser.

DETAILED DISCLOSURE

Figure 1:
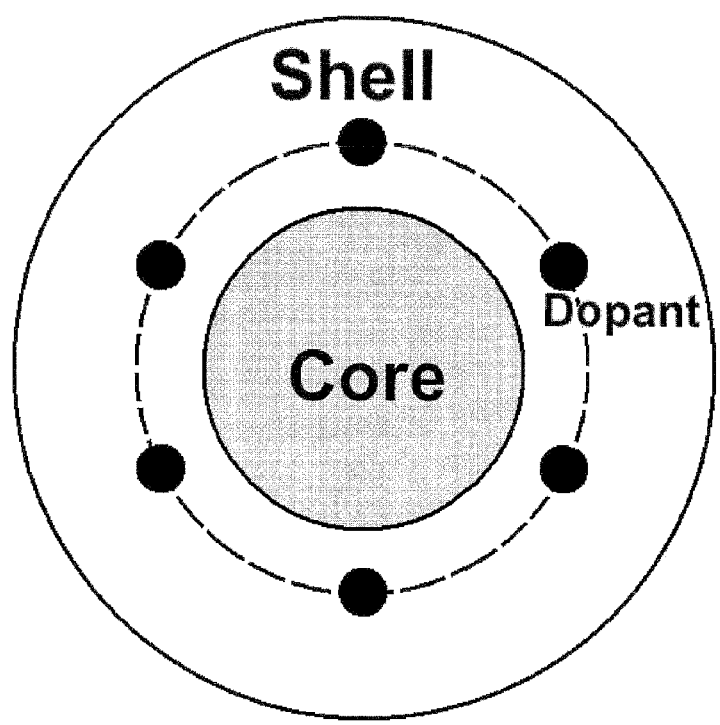
FIG. 1 show a general Scheme for color-tunable, dual emitting nanocrystals, which are composed of a core/shell structure, in accordance with an embodiment of the invention.

It has been discovered that that a plurally doped-semiconductor nanoparticles can exhibit excitation-intensity-dependent dual or multiple emissions. In embodiments of the invention a device can be constructed comprising at least one plurally doped-semiconductor nanoparticle and an illumination source that can provide a controlled intensity of illumination to the one or more plurally doped-semiconductor nanoparticles such that the proportion of the two or more emission from the plurally doped-semiconductor nanoparticle can be controlled the net "color" of the emission. In one embodiment of the invention, the plurally doped-semiconductor nanoparticles can be plurally doped-semiconductor core/shell nanoparticles as schematically shown in FIG. 1 for a nanoparticle having a core and a single shell of different materials. Hence multiple colors can be emitted from a single plurally doped-semiconductor nanoparticle depending on the intensity of the illuminating source, for example a lamp or a laser. As used herein, a color is any frequency or combination of frequency of any portion of the electromagnetic spectrum and is not restricted to those of the visible range as the detector of the color need not be the human eye or any detector that is limited to the visible spectrum. The illumination source can be, but is not necessarily, outside of the range of colors emitted by the plurally doped-semiconductor nanoparticles comprising the device. A color-tunable device is possible where the device comprises at least one plurally doped nanocrystal.

Figure 2:
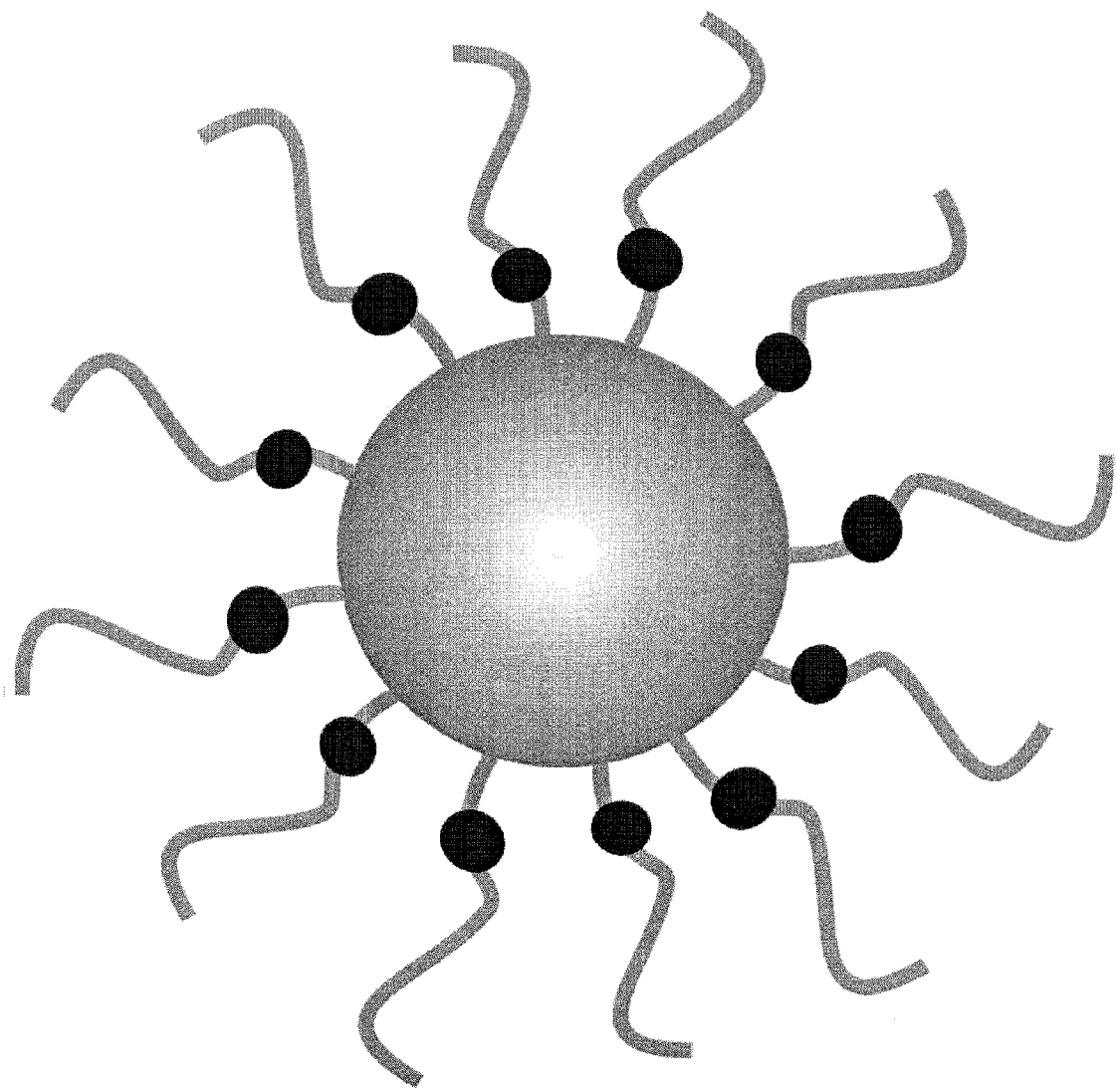
FIG. 2 shows a conceptual scheme of organic-dye functionalized semiconductor nano crystals.

The nanoparticles can be doped with a plurality of one or more dopant species. For example, in one embodiment of the invention, a single dopant species can be present in the plurally doped-semiconductor nanoparticles two or more times. For example, in another embodiment of the invention, two or more dopant species can be present, where each species can be present in a plurally doped-semiconductor nanoparticle two or more times. For example, in another embodiment of the invention a plurality of different types of plurally doped-semiconductor nanoparticles can be included in a device where each type of plurally doped-semiconductor nanoparticle emits a different range of colors. In some embodiments of the invention, the plurally doped-semiconductor nanoparticles can include a functional surface moiety to permit the nanoparticles attachment to a surface, dispersion in a fluid, dispersion as filler in a solid composite structure or incorporate a dyes to optimize, tailor or modify the photoluminescent properties of the nanoparticles, as long the surface modification does not inhibit access of the illuminating radiation to the plurally doped-semiconductor nanoparticles. For example, as schematically illustrated in FIG. 2 for an organic-dye functionalized nanocrystal, an organic dye surface functionalization can involve a metal-ligand complex such as a ruthenium bipyridine complex, or other chelates of rare earth ions. In like fashion, Ru bis(2,2'bipyridine) (2,2'bipyridine-4,4'-dicarboxylic acid), NHS esters thereof, or other functional metal-ligand complexes can be used for dye attachment or attachment of proteins or other biomolecules. Other functional groups can be attached or complexed to the surface of the plurally doped-semiconductor nanoparticles by various functionalizing agents, such as molecular metal chalcogenide surface ligands, for example $Sn_2S_6^{-4}$, and $Sn_2Se_6^{-4}$, depending on the properties to be modified, as can be appreciated by those skilled in the art. The devices can be used in application as visual displays, biological tags for medical diagnostics, and smart tags to surfaces for identification, for example on currency.

Figure 3:
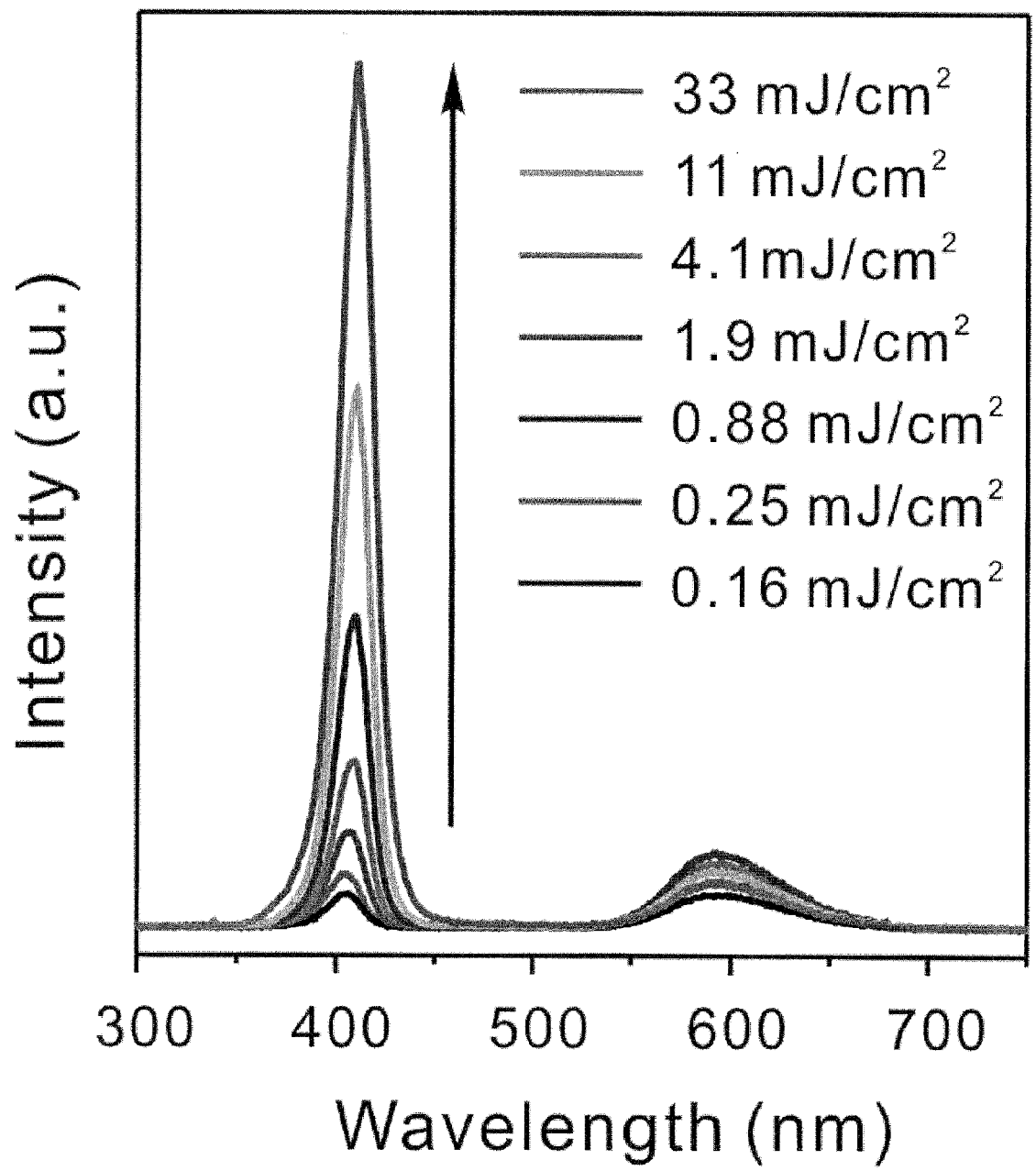
FIG. 3 shows PL spectra of CdS/ZnS core/shell nanocrystals doped with an average of six Mn ions at a concentration of 1.08 µM in hexane under different laser fluences, as indicated in the legend in accordance with an embodiment of the invention.

In one specific embodiment of the invention, a device comprising a plurally Mn-doped CdS/ZnS core/shell nanocrystals exhibit excitation-intensity-dependent dual emission where the excitation with different laser fluence results in differing proportions of the two emission frequencies permitting the selective emission of different colors. The dependence of the emission with fluence for the two emissions from plurally Mn-doped CdS/ZnS core/shell nanocrystals with six Mn on average for 1.08 μM nanocrystals in hexane solutions is shown in FIG. 3. The device can display the extreme of the colors defined by emission exclusively from one of the two emission mode (a single frequency) or any combination of intensities of the emission modes (a selective proportion of the two frequencies). Hence a single plurally Mn-doped CdS/ZnS core/shell nanocrystals (or any other dual emitting plurally doped-semiconductor nanoparticle) can provide a wide range of colors. Where a plurally doped-semiconductor nanoparticle provides a multiplicity of emission modes addressable in different proportions due to the intensity of the irradiation source, an entire spectrum, for example the entire visible spectrum of colors can be emitted by a single nanoparticle (pixel).

Figure 4:
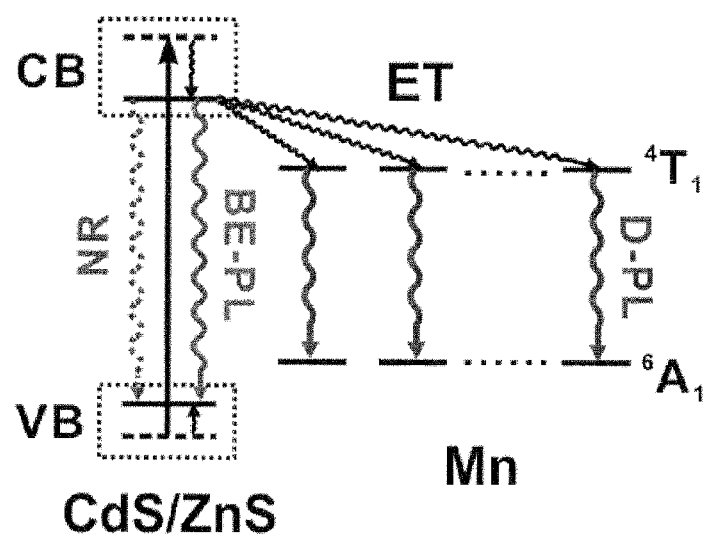
FIG. 4 is a schematic of energy levels and carrier relaxation pathways in a Mn-doped nanocrystal: CB for conduction band and VB for valence band in accordance with an embodiment of the invention.

For example, upon absorption of a photon by a plurally Mn-doped CdS/ZnS core/shell nanocrystal according to an embodiment of the invention, formation of an excited electron-hole pair occurs. The excited electron-hole pair can be deactivated by at least two processes wherein a plurality of these processes is emissive, as illustrated by the diagram in FIG. 4. Although these emissions need not necessarily be two emissions in the visible spectrum, they can be, and, for descriptive purposes, embodiments where the emissions are in the visible range will be disclosed. For example, consider, as illustrated in FIG. 4, a plurally doped semiconductor nanocrystal that deactivates by the three processes: (1) radiative recombination at the nanocrystal band edge, with the rate constant $k_{BE-R}$; (2) non-radiative recombination at the nanocrystal band edge; with the rate constant $k_{BE-NR}$; and (3) energy transfer to a dopant ion inside the nanocrystal, with the rate constant $n \times k_{ET}$, where "n" is the number of dopant ions inside the nanocrystal in the ground state. After the energy is transferred to a dopant ion, the excited ion relaxes to its ground state, radiatively with the rate constant $k_{D-R}$ or nonradiatively with the rate constant $k_{D-NR}$. Under weak excitation, the energy transfer efficiency ($\Phi_{ET}$) and the spectra integrated intensity ratio of the band edge to dopant emissions ($I_{BE}/I_D$) is expressed by the following equations:

$$\Phi_{ET} = \frac{n \times k_{ET}}{k_{BE-R} + k_{BE-NR} + n \times k_{ET}} \quad \text{Equation 1}$$

$$\frac{I_{BE}}{I_D} \propto \frac{k_{BE-R}}{n \times k_{ET}} \times \frac{k_{D-R} + k_{D-NR}}{k_{D-R}} \quad \text{Equation 2}$$

It has been demonstrated by Yang et al. *Chem. Eur. J.* 2009, 15, 1386 (incorporated herein by reference) that $\Phi_{ET}$ and $I_{BE}/I_D$ are dependent on the number of Mn ions in the weak excitation regime where this phenomenon was studied using a fluorometer. The transfer efficiency and the intensity ratio were not dependent on the excitation intensity. The inventors discovered that when the excitation source has a sufficiently high intensity, the absolute and relative intensities of the two emission modes can be varied by controlling the intensity of the excitation source for a plurally doped semiconductor nanocrystal. Although not to be bound by theory, this dependence can be explained with regards to an Mn-doped CdS/ZnS core/shell nanocrystals because the emission lifetime of a $Mn^{2+}$ ion dopant is on the order of milliseconds, the doped nanocrystal can undergo additional excitation where one of the Mn ion dopants is already at its excited state can possibly occur if the excitation source has a sufficiently high intensity. As a consequence, the number of Mn dopants at their ground state (i.e., n) decreases with the increase of excitation intensity, and thus $\Phi_{ET}$ and $I_{BE/ID}$ exhibits excitation intensity dependence.

Figure 5:
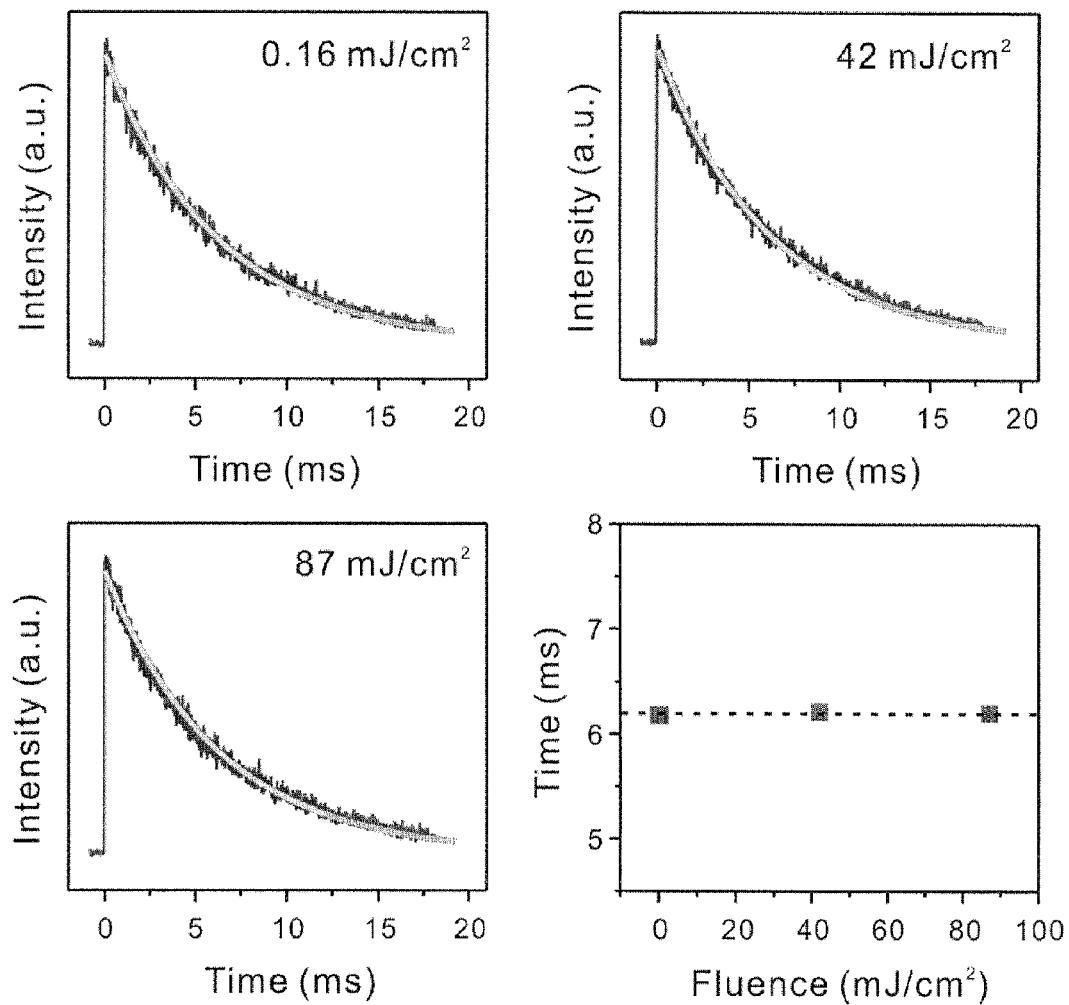
FIG. 5 are plots of Mn emission intensity decay of CdS/ZnS core/shell nanocrystals doped with an average of six Mn ions under different laser fluences: a) 0.16 $mJ/cm^2$; b) 42 $mJ/cm^2$; and c) 87 $mJ/cm^2$ superimposed on a lifetime fitting of the Mn emission. All fittings indicate d) a Mn emission lifetime of 6.2 ms in accordance with an embodiment of the invention.
Figure 6:
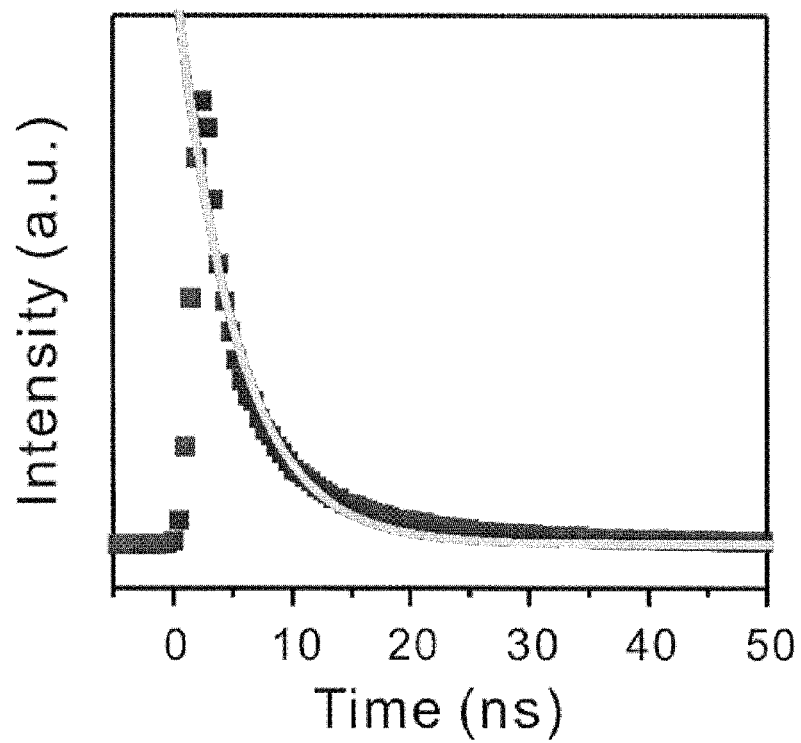
FIG. 6 shows plotted data points for band-edge emission intensity decay as a function of time for 1.08 µM in hexane solutions of CdS/ZnS core/shell nanocrystals doped with an average of six Mn ions and an exponential fitting line where the emissions has an apparent lifetime of about 5 ns in accordance with an embodiment of the invention.
Figure 7:
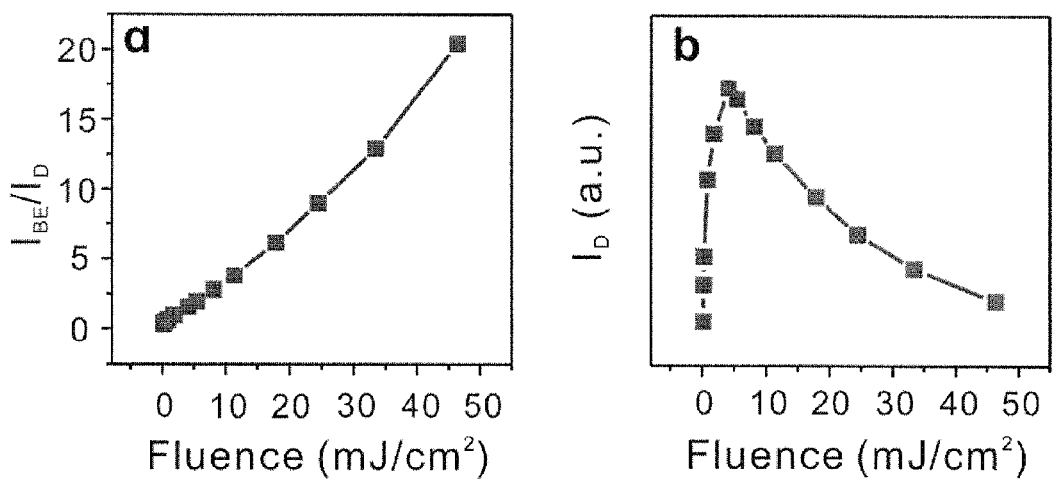
FIG. 7 shows plots of a) $I_{BE}/I_D$ and b) $I_D$ for CdS/ZnS core/shell nanocrystals doped with an average of six Mn ions as a function of laser fluence in accordance with an embodiment of the invention.

In an embodiment of the invention where the plurally doped nanocrystal is a Mn-doped CdS/ZnS core/shell nanocrystal, a laser, for example a XeCl excimer laser, can be used as an excitation source to promote the photoluminescence (PL) property differences of plurally Mn-doped CdS/ZnS core/shell nanocrystals when varying the laser fluence used for excitation. To illustrate control of emission, three types of plurally Mn-doped core/shell nanocrystals are considered. Each type has a core size of 3.1 nm and shell thickness of 1.55 nm, or a shell of about 4.8 monolayers (ML), with a plurality of Mn dopants at about 1.6 ML in the ZnS shell. The different plurally Mn-doped core/shell nanocrystals have an average of two, six, and 15 Mn ions per nanocrystal. Under weak excitation from a fluorometer, all three types of Mn-doped nanocrystals exhibit two emission bands at 405 nm (band-edge emission) and 595 nm ($Mn^{2+}$ emission) as shown in FIG. 1 for the six Mn ion doped nanocrystal. The nanocrystals doped with six Mn ions have a Mn-emission lifetime of 6.2 ms, as illustrated for plots of the Mn emission intensity decay for different laser fluences in FIG. 5, and an apparent band-edge-emission lifetime of 5 ns, as illustrated in FIG. 6, for 1.08 μM solutions of nanocrystals in hexane, which shows the band-edge emission intensity decay as a function of time. At a fluence of 0.16 mJ/cm², the nanocrystals exhibit a PL spectrum with an intensity ratio ($I_{BF}/I_D$) of 0.32, which is nearly identical to that obtained using the fluorometer in the weak excitation regime. By increasing the fluence, both $I_{BE}$ and $I_{BE}/I_D$ monotonically increase as illustrated in FIG. 7. This increase of $I_{BE}$ and $I_{BE}/I_D$ is a previously unobserved characteristic property of the carrier relaxation dynamics for a plurally doped nanocrystal, specifically for an exemplary plurally Mn-doped CdS/ZnS core/shell nanocrystal with multiple Mn dopants at their excited state ($^4T_1$). Until all dopant Mn ions in this nanocrystal are excited, the higher the fluence, the greater the proportion of Mn ions in the excited state than in the ground state ("n" of Equations 1 and 2). Therefore, in such carrier relaxation processes, more photons are generated from the band-edge pathway, and both $I_{BE}$ and $I_{BE}/I_D$ increase with increasing exaction fluence. When all Mn ions in the nanocrystal are excited, an increase of excitation fluence leads to a larger $I_{BE}$, and a larger $I_{BE}/I_D$ because of the increase in the number of absorption and emission events.

Figure 8:
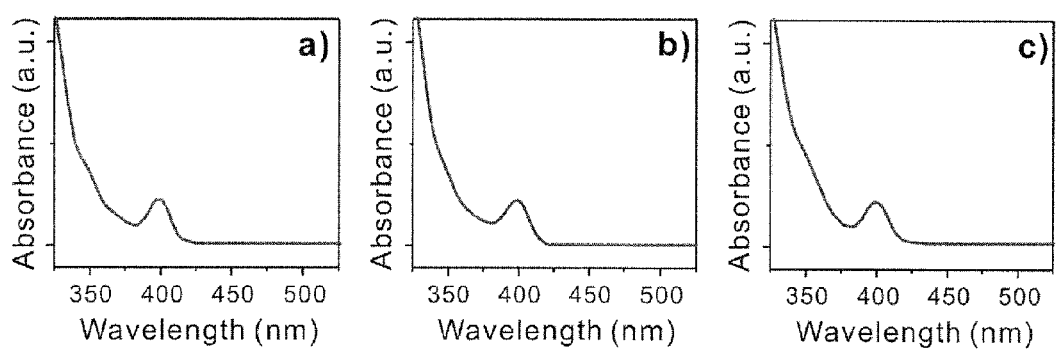
FIG. 8 shows UV-Vis spectra of CdS/ZnS nanocrystals doped with an average of: a) two Mn ions; b) six Mn ions; and c) 15 Mn ions in accordance with an embodiment of the invention.
Figure 9:
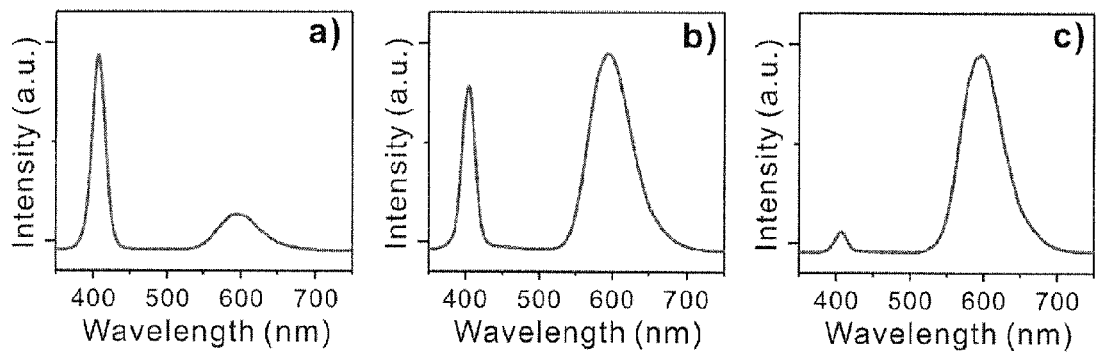
FIG. 9 show steady-state photoluminescence of CdS/ZnS nanocrystals doped with an average of: a) two Mn ions; b) six Mn ions; and c) 15 Mn ions in accordance with an embodiment of the invention.
Figure 10:
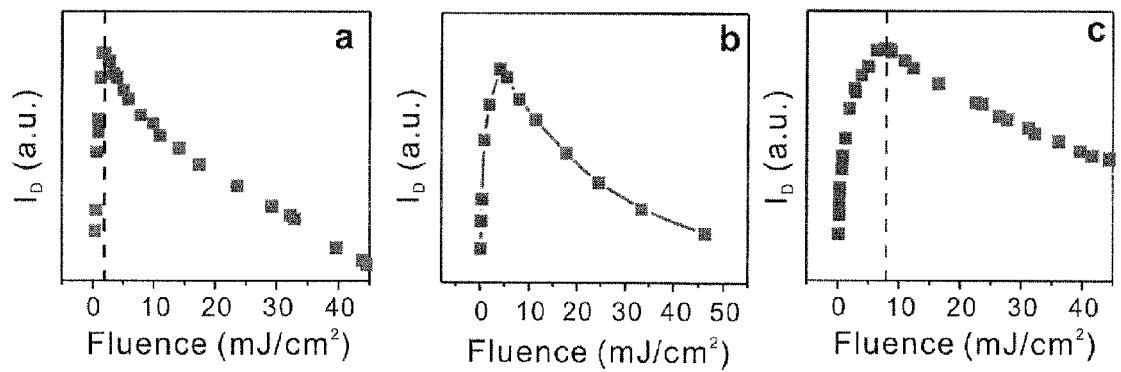
FIG. 10 shows plots of $I_D$ as a function of laser fluence for CdS/ZnS nanocrystals doped with: a) two Mn ions; b) six Mn ions; and c) 15 Mn ions in accordance with an embodiment of the invention.
Figure 11:
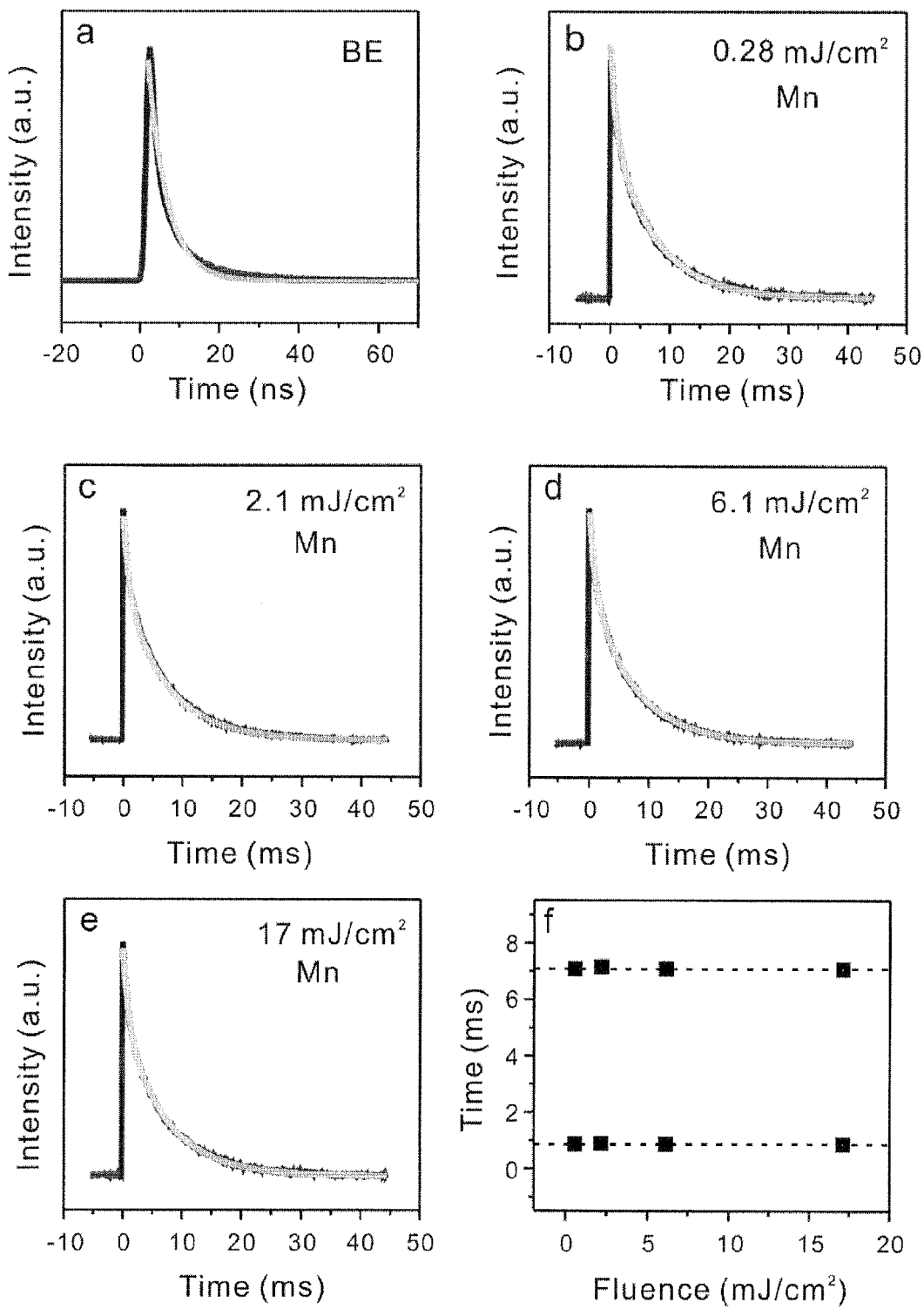
FIG. 11 shows plots, for 1.08 µM solutions in hexane of CdS/ZnS core/shell nanocrystals doped with an average of 6 Mn ions, of (a) band-edge (BE) emission intensity decay and an exponentially fitted line as a function of time where the major component of the emission has an apparent lifetime of ~5.0 ns and Mn dopant emission intensity decay curves and fitted lines under laser fluence of: (b) 0.28: (c) 2.1: (d) 6.1; and (e) 17 mJ/cm² where that yield the resulting (f) Mn emission lifetimes of ~0.9 ms and ~7.1 ms in accordance with an embodiment of the invention.
Figure 12:
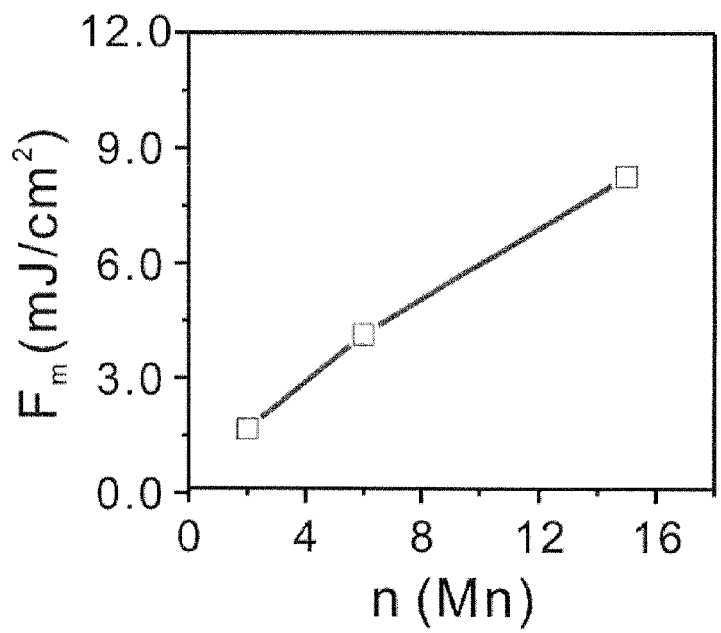
FIG. 12 shows a plot of $F_m$ as a function of the average number (n) of Mn ions inside a plurally Mn doped CdS/ZnS core/shell nanocrystal in accordance with an embodiment of the invention.
Figure 13:
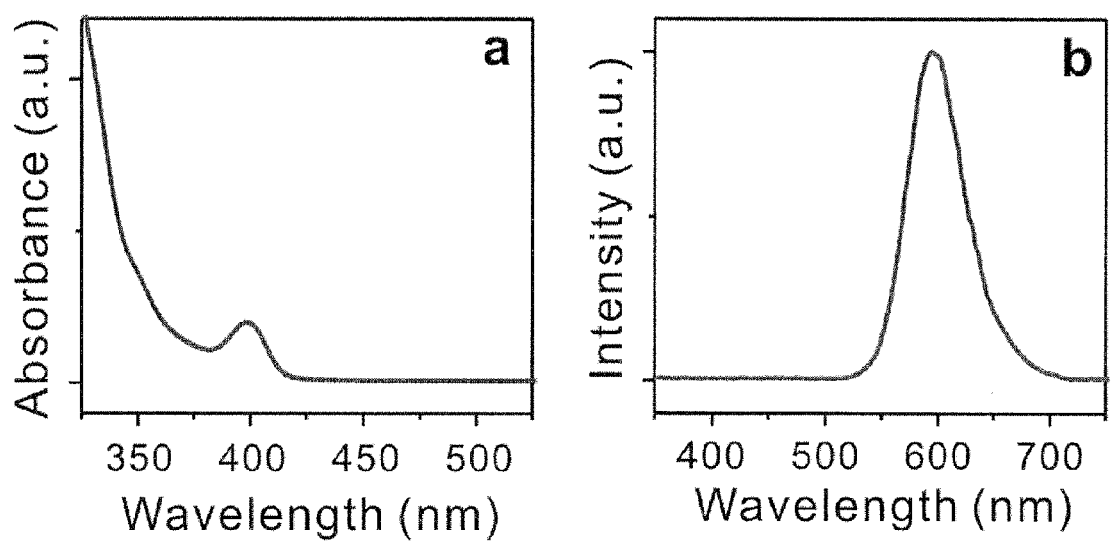
FIG. 13 shows a) a UV-Vis spectrum and b) a steady-state photoluminescence spectrum of CdS/ZnS nanocrystals doped with an average of 20 Mn ions.

The creation of a nanocrystal with a plurality of dopant Mn ions at their excited state is consistent with a change of $I_D$ as can be seen in FIG. 7b. As the fluence increases, $I_D$ increases, reaching a maximum at a fluence of 4.1 mJ/cm², which corresponds to about 10 photons/nanocrystal. The increase of $I_D$ is consistent with an increase of the number of Mn ions at $^4T_1$. This maximum Mn-emission intensity is achieved due to the total excitation of all the six Mn dopants in the nanocrystals, as illustrated in FIG. 4. With a further increase of fluence, $I_D$ decreases. The decrease of $I_D$ is due to reabsorption and is not caused by an increase of $k_D$-NR due to collective interactions (for example, magnetic coupling) between excited Mn ions in this high intensity excitation regime because results show that the Mn-emissions lifetime of these nanocrystals is independent of laser fluence, where no measurable change was found as the fluence was increased from 0.16 to 87 mJ/cm². Excitation-intensity-dependent dual emission varies for plurally doped nanoparticles, such as plurally doped Mn-doped CdS/ZnS core/shell nanocrystals, depending on the doping levels. For example, nanocrystals doped with two, six or 15 Mn ions exhibit qualitatively similar PL property, having very similar absorption spectra as shown in FIG. 8 and nearly identical wavelengths of emission at ~405 nm (band-edge emission) and ~595 nm ($Mn^{2+}$ dopant emission) with different relative intensities based on the value of n at a steady state as shown in FIG. 9, but have quantitatively different photoluminescence properties for different values of n for different fluence, as can be seen in FIG. 10. The nanocrystals doped with 6 Mn have an apparent band-edge emission lifetime of 5.0 ns. The Mn-emission lifetime can be fitted by two exponential decays with lifetimes of 0.9 ms and 7.1 ms, as shown in FIG. 11. This long lifetime (~7.1 ms) is unusually long and is believed to indicate the high quality of the doped core/shell nanocrystals. The Mn emissions intensity of these particles reaches their maximum at different laser fluences where the fluence for maximal Mn emission intensity (Fm) depends on the average number of Mn ions in the nanocrystals as plotted in FIG. 12. Fm is 1.7 $mJ/cm^2$ (about 4 photons/nanocrystal) for particles with two Mn ions, 4.1 $mJ/cm^2$ (about 10 photons/nanocrystal) for particles with six Mn ions and 8.3 $mJ/cm^2$ (about 20 photons/nanocrystal) for particles with 15 Mn ions. The qualitative steady state similarities of plurally doped Mn-doped CdS/ZnS core/shell nanocrystals is limited to values of n that are sufficiently small such that both modes of emission can be effectively addressed. At larger values of n, only one emission mode is observed, as illustrated in FIG. 13 for a plurally doped Mn-doped CdS/ZnS core/shell nanocrystal where n=20.

Figure 14:
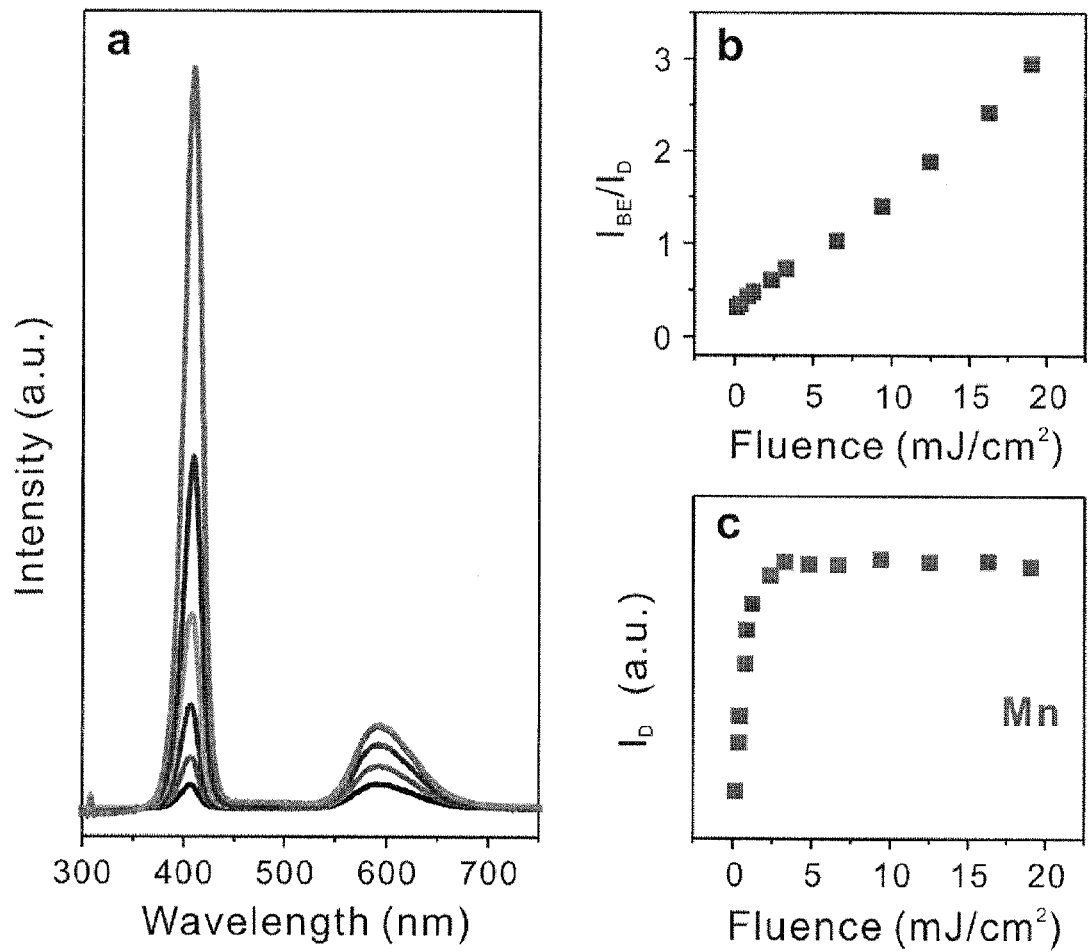
FIG. 14 shows a) PL spectra of CdS/ZnS core/shell nanocrystals doped with an average of six Mn ions at a concentration of 2.16 µM in hexane under different laser fluences, from 0.13 to 19 mJ/cm², and plots of b) $I_{BE}/I_D$ and c) $I_D$ as a function of laser fluence in accordance with an embodiment of the invention.
Figure 15:
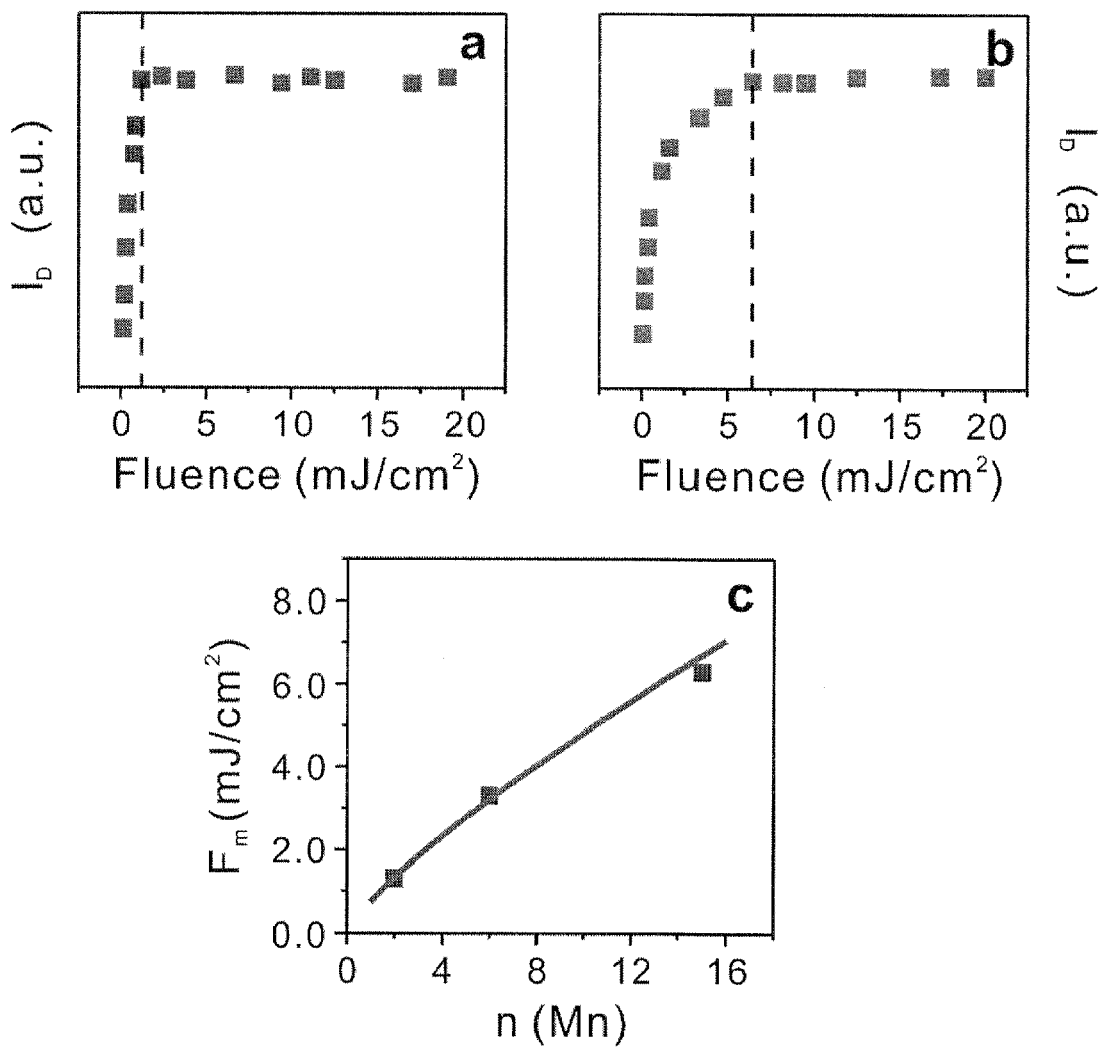
FIG. 15 shows a plots of: $I_D$ for CdS/ZnS core/shell nanocrystals doped with an average of a) 2 and b) 15 Mn ions at a concentration of 2.16 µM in hexane as a function of laser fluence: and c) a plot of $F_m$ as a function of average Mn ions per nanocrystal for in accordance with an embodiment of the invention.

At a concentration of 2.16 μM nanocrystals doped with 6 Mn, At a fluence of 0.13 $mJ/cm^2$, using a XeCl eximer laser and a spectrometer as disclosed below in the Materials and Methods—PL studies, but with a 180° geometry, the nanocrystals exhibit a PL spectrum with an intensity ratio ($I_{BE}/I_D$) of 0.32, which is nearly identical to that obtained using the fluorometer at 1.08 μM nanocrystals. With the increase of fluence, both $I_{BE}$ and $I_{BE}/I_D$ monotonically increase as can be seen in FIG. 14. Under these conditions of the experiment the reabsorption was not observed and the intensity did not decrease after achieving its maximum with an increase in fluence. Again, as illustrated in FIG. 14c the increase in $I_D$ with fluence indicated that the maximum corresponded to about 10 photons/nanocrystal. Also, the increase in $I_D$ corresponds to the number of Mn dopants in the nanocrystal, where, as shown in FIG. 15, nanocrystals doped with different levels of Mn displayed different fluences for the maximum emission intensity ($F_m$) that corresponded to 1.3 $mJ/cm^2$ (~4 photons/nanocrystal) with 2 Mn and 6.3 $mJ/cm^2$ (~19 photons/nanocrystal) with 15 Mn dopant in the nanocrystal.

Figure 16:
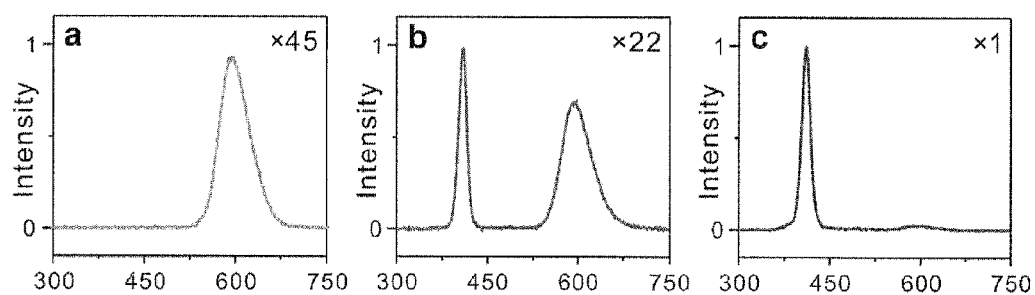
FIG. 16 shows PL spectra for CdS/ZnS core/shell nanocrystals doped with an average of six Mn ions with normalized intensities under a fluence of: a) 0.10 mJ/cm²; b) 2.7 mJ/cm²; and (c) 60 mJ/cm² in accordance with an embodiment of the invention.
Figure 17:
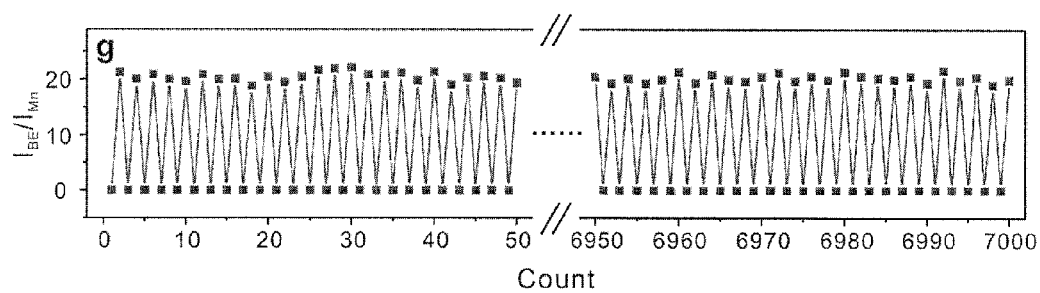
FIG. 17 shows a plot of switching cycles (in counts) between two fluences 0.10 and 60.0 mJ/cm² for CdS/ZnS core/shell nanocrystals doped with an average of six Mn ions in accordance with an embodiment of the invention.

Color-tunable properties, according to embodiments of the invention, of plurally doped nanocrystals are evident in transparent nanocrystal/polymer composite film containing CdS/ZnS core/shell nanocrystals doped with 20 Mn ions. The films exhibit only Mn emission at 595 nm at low excitation fluence of 0.10 $mJ/cm^2$, as shown in the PL spectrum of FIG. 16a. An increase of the fluence to 2.7 $mJ/cm^2$ results in a color change of the nanocrystal film from orange to purple as the crystal also has an emission of the nanocrystal band edge as shown in FIG. 16b. A further increase of the fluence to 60 $mJ/cm^2$ results in a dominance of the blue band-edge emission of the nanocrystals as shown in the PL spectra of FIG. 16c. The excitation-intensity-dependent color change is highly reversible as shown in FIG. 17 for seven thousand color switching cycles between orange at 0.10 $mJ/cm^2$ and blue at 60 $mJ/cm^2$ for a plurally doped nanocrystal film.

Figure 18:
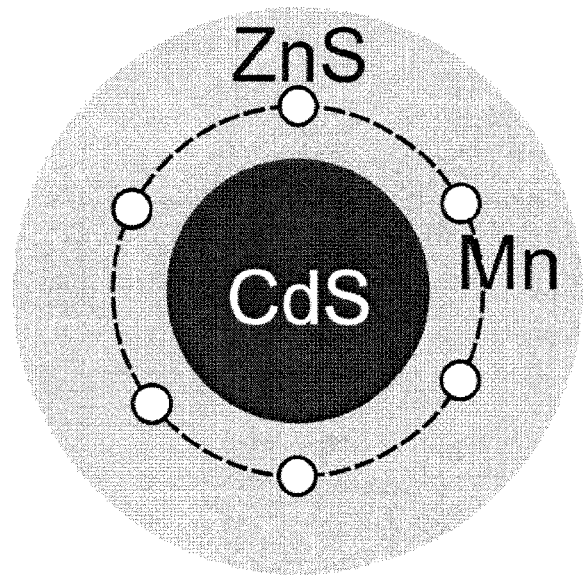
FIG. 18 shows a conceptual scheme and a transmission electron microscope (TEM) image of plurally Mn-doped CdS/ZnS core/shell nanocrystals in accordance with an embodiment of the invention.
Figure 18:
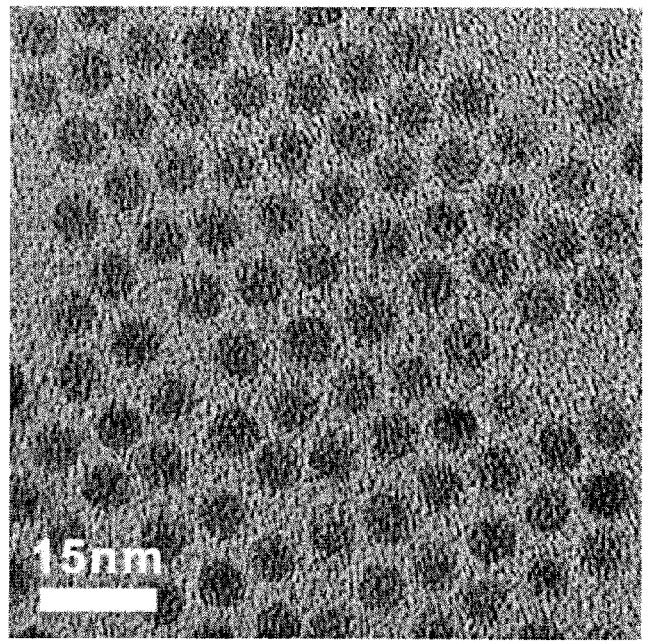
Figure 19:
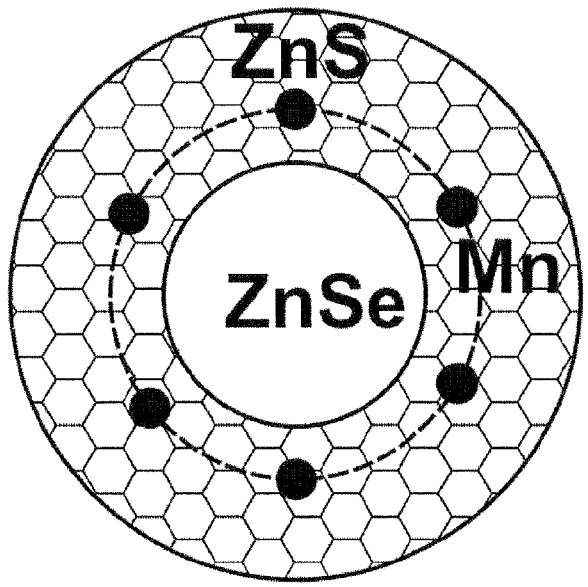
FIG. 19 shows a conceptual scheme and a TEM image of plurally Mn-doped ZnSe/ZnS core/shell nanocrystals in accordance with an embodiment of the invention.
Figure 19:
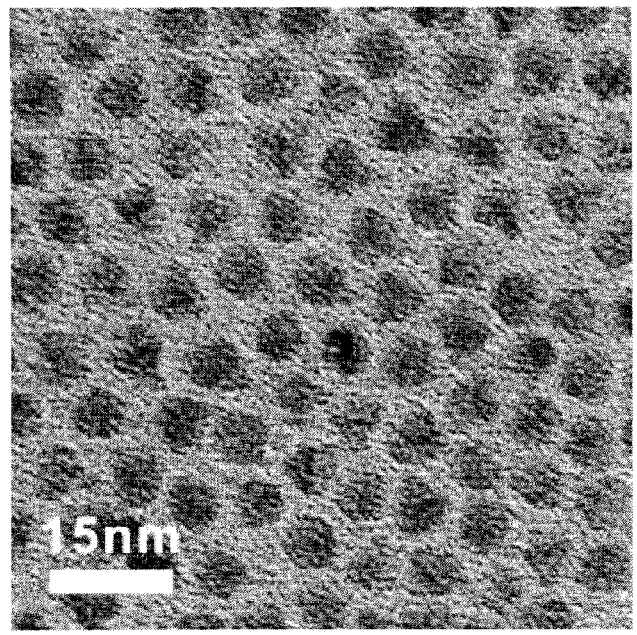

Although embodiments of the invention have been illustrated by plurally doped Mn-doped CdS/ZnS core/shell nanocrystals, shown in FIG. 18 schematically and as an transmission electron microscope (TEM) image, other semiconductor compositions can be used, for example as illustrated in FIG. 19 for plurally doped Mn-doped ZnSe/ZnS core/shell nanocrystals. In other embodiments of the invention, the dopant need not be Mn, for example Ni, Eu, Tb, or other rare earth dopants can be used. Unlike the plurally doped core/shell nanocrystals illustrated in FIGS. 18 and 19, the dopant can reside in the core rather than the shell. In other embodiments of the invention a core/shell structure is not needed and a single homogeneous nanoparticle can be plurally doped. In embodiments of the invention with core/shell structures either or both portions can be plurally doped with the same or different dopants. According to an embodiment of the invention a nanoparticle can have multiple shells and each shell can be plurally doped with the same or different dopants. Although embodiments of the invention are illustrated by examples where the particles are spherical, in other embodiments of the invention particles can have different shapes, including rods, cubes, or tetrapods.

METHODS AND MATERIALS

Chemicals

Sulfur powder (99.999%), oleic acid (OLA, 90%), 1-octadecene (ODE, 90%), octadecane (ODA, 99%), oleyamine (OAm, 70%), polystyrene-block-polybutadiene ($C_{12}H_{14}$, 30 wt % styrene, 80% diblock), cadmium nitrate tetrahydrate ($Cd(NO_3)_2 \cdot 4H_2O$, 99.99%), zinc stearate (count as ZnO %≈14%), myristic acid (MA, 99%), nitric acid (69.5%), manganese acetate tetrahydrate (99%), and sodium hydroxide (NaOH) were purchased from commercial sources and used as received without further purification. Cadmium myristate was synthesized according to a literature method.

Synthesis of Mn-Doped CdS/ZnS Core/Shell Nanocrystals

Four types of plurally Mn-doped core/shell nanocrystals were synthesized as disclosed in Yang et al., *J. Am. Chem. Soc.* 2006, 128, 12428 and Yang et al. *J. Am. Chem. Soc.* 2008, 130, 15649 with doping levels of 2, 6, 15, and 20 Mn ions/nanocrystal on average. The three plurally Mn-doped core/shell nanocrystals had identical core diameters of 3.1 nm and shell thicknesses of 1.55 nm.

Precursor Preparation

Mn-Precursor Solution

OAm (4 mL) was placed in a 25 mL flask and heated at 120° C. for 10 min under a vacuum of 20 mTorr. After cooling to room temperature, $Mn(OAc)_2 \cdot 4H_2O$ (4.9 mg, 0.02 mmol) was rapidly added into the flask. The mixture was degassed at room temperature 120° C. for 10 min until a clear solution was obtained, which was used immediately for doping.

Sulfur Solution

Sulfur powder (12.8 mg, 0.4 mmol) was combined with ODE (10 mL) in a flask. After degassing at room temperature for 10 min, the solution was heated to 130° C. for 5 min under an Ar flow and subsequently cooled to room temperature.

Zinc Stearate Solution

Zinc stearate powder (0.4 mmol) was combined with ODE (10 mL) in a flask. After degassing at room temperature for 10 min, the mixture was heated to 200° C. to dissolve zinc stearate. The solution was cooled to room temperature with the slurry formed was directly used for growth of ZnS-shells.

Synthesis of Plurally Mn-Doped CdS/ZnS Core/Shell Nanocrystals

Synthesis of CdS/ZnS Core/Shell Nanocrystals

Zinc-blend CdS nanocrystals were prepared using a non-injection synthesis as disclosed in Yang et al., *J. Am, Chem. Soc.* 2006, 128, 12428 and Yang et al. *J. Am. Chem. Soc.* 2008, 130, 15649. Second, ZnS shells were grown on the resulting CdS nanocrystals at 220° C. in a 3:1 by volume mixture of ODE and OAm. Two monolayers of ZnS were formed on the CdS nanocrystals by alternately injecting zinc stearate (40 mM in ODE) and sulfur (40 mM in ODE). Growth time was 10 min after each injection followed by cooling to room temperature. The resulting CdS/ZnS core/shell nanocrystals were precipitated in acetone and resuspended in hexane.

Dopant Growth

Hexane suspensions of CdS/ZnS core/shell nanocrystals (2 mL, 50.4 nmol) were added to a 3:1 by volume mixture of ODE and OAm (8.0 mL) followed by removal of the hexane under vacuum. Under an argon flow, the nanocrystal suspension was heated to 280° C. Solutions of $Mn(Ac)_2$ and Sulfur, at a 1:1 molar ratio, were alternatively introduced into the hot solution dropwise. After 20 minutes, nanocrystals were precipitated by the addition of acetone. The nanocrystals were resuspended in hexane at a high nanocrystal loading.

ZnS-Shell Growth

The hexane suspension (1 mL, 27.4 nmol) was added into a 3:1 by volume ODE and OAm mixture followed by hexane removal under vacuum. The nanocrystal solution was heated to 280° C. under an Ar flow. Alternate injections of zinc stearate (40 mm in ODE) and sulfur (40 mm in ODE) with 10 minutes between injections resulted in monolayer by monolayer growth of a ZnS shell. After achievement of a desired shell thickness, a large excess of zinc stearate (0.12 mmol in ODE) was injected into the reaction flask for the growth of about four monolayers of ZnS. After 5 min the reaction mixture was cooled to room temperature, and the nanocrystals were purified by precipitation upon addition of acetone. The resulting nanocrystals were further purified by three precipitation-resuspension cycles using methanol for precipitation and toluene for resuspension. Samples for ICP measurements were additionally purified by two pyridine-exchange treatments according to the literature method resulting in a dispersion of nanoparticles in pyridine. Then the pyridine-capped particles were combined with trioctylphosphine oxide and dodecylamine (1:1) and the ligand exchanged nanoparticles were redispersed in toluene.

Determination of Mn-Doping Level

The Mn-doping levels of the resulting core/shell nanocrystals were determined by a combination of Transmission electron microscopy (TEM), Inductively-coupled plasma atomic emission spectroscopy (ICP) and electron paramagnetic resonance spectroscopy (EPR) according to our previous method. ICP measurements were performed on a Vista RL CCD Simultaneous ICP-AES (Varian, Inc.). The purified nanocrystal samples were digested with nitric acid (69.5%) at about 100° C. until a colorless solution resulted. The digestion solutions were combined with additional nitric-acid solution resulting in a 1-2% nitric-acid concentration. Concentrations of Mn, Cd, and Zn in solutions were determined by comparison of ICP data with corresponding working curves. The average number of Mn ions per dot was calculated using the size of the CdS core determined by TEM and the ratio of [Mn]/[Cd] determined by ICP.

Absorption Spectra

UV-Vis absorption spectra were measured using a Shimadzu UV1701. Nanocrystals were dispersed in toluene for the measurements.

Steady-State Photoluminescence (PL) Spectra

Photoluminescence (PL) experiments were performed on a fluorometer (Fluorolog-3, Horiba Jobin Yvon, Irvine, Calif.).

Transmission Electron Microscopy (TEM)

Toluene solution of purified nanocrystals were dropped onto carbon-coated copper grids and dried in air and stored overnight in a vacuum dessicator. The TEM images were acquired using a JEOL transition electron microscope (200 kV).

PL Studies Using a XeCl Excimer Laser as Excitation Source

Suspensions

Plurally Mn doped CdS/ZnS core/shell nanocrystals were suspended in hexane at a concentration of 1.08 µM, and placed in a quartz cell. The cell was mounted and optically excited using a XeCl excimer laser (308 nm with a pulse width of about 30 ns and repetition frequency of 6 Hz), which was focused using a 28 cm focal length lens. The excitation fluence was controlled using a set of neutral density filters. Photoluminescence signals were collected perpendicularly by a fixed optical fiber coupled to a spectrometer (SD2000, Ocean Optics) with a 1 second integration time.

In a typical experiment, a hexane solution of the nanocrystals doped with six Mn ions (1.08 µM) was excited by a XeCl excimer laser (30-ns pulses with a repetition rate of 6 Hz at 308 nm). The excitation fluence was fine tuned with a set of neutral density filters. The emissions from this nanocrystal solution were detected utilizing a spectrometer (Ocean Optics, with an integration time of 1 s) at 90° geometry. In this experiment, the time interval between laser pulses (~166 ms) was much longer than the Mn-emission lifetime; therefore the integrated emissions from the nanocrystals was determined by the pump fluence of single pulses.

Film Samples

Polystyrene-block-polybutadiene (~300 mg) was dissolved overnight in a toluene suspension of plurally Mn doped CdS/ZnS core/shell nanocrystals (1 mL, 1.08 µM) to yield a highly viscosity homogenous suspension, that was drop casted onto a mold of the letters UF. The toluene was evaporated and the nanocrystal/polymer composite was demolded as a thin film and placed onto a quartz substrate (2.5 cm×2.5 cm). This substrate was mounted and optically excited using a XeCl excimer laser at 308 nm with a pulse width of about 30 ns and a repetition frequency of 6 Hz. Excitation fluence was controlled using a set of neutral density filters. Photoluminescence signals were collected by a perpendicularly mounted optical fiber coupled to a detected using a spectrometer (SD2000, Ocean Optics) with an integration time of 1 second. Photo images were taken using a digital camera (Canon EOS 40D).

Lifetime Measurements

Band-Edge Lifetime Measurements

Plurally Mn doped CdS/ZnS core/shell nanocrystals were dispersed in hexane to have an optical density of 0.1 at 375 nm, and was placed in a quartz cell. The band-edge lifetime measurements were conducted using a time-correlated single-photon-counting spectrometer with a NANOLED (1 ns, 375 nm, Horiba Jobin Yvon, Irvine, Calif.).

Mn Lifetime Measurement

Plurally Mn doped CdS/ZnS core/shell nanocrystals were dispersed in hexane with a concentration of 1.08 µM, and placed in a quartz cell. The cell was mounted and optically excited with a XeCl excimer laser at 308 nm with a pulse width of about 30 ns and a repetition frequency of 6 Hz focused by a 28 cm focal length lens. The excitation fluence was controlled by a set of neutral density filters. Photoluminescence signals were collected using a perpendicularly fixed optical fiber coupled to a R955 photomultiplier tube (PMT, Hamamatsu) through a 500 nm high-pass filter (V/O Mashpriborintorg). The signal from the PMT was collected by a TDS520A digital oscilloscope (Tektronix) and saved to a computer using Wavestar 2.4 software (Tektronix). The lifetime is determined by fitting data in Microsoft Excel.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A device for photo-stimulated color emission comprising:
    at least one plurally doped semiconducting nanoparticle comprising at least one semiconducting material and a plurality of at least one dopant, wherein said plurally doped semiconducting nanoparticles upon excitation permit a plurality of emission processes including a radiative recombination at the nanocrystal band edge and at least one with an energy transfer to a dopant ion; and
    an irradiation source with a variable intensity output, wherein emissions by said plurally doped semiconducting nanoparticles of electromagnetic radiation occur at a plurality of wavelength maxima wherein the relative intensities of said emissions of said wavelength maxima depends upon the intensity of the irradiation.

2. The device of claim 1, wherein said at least one semiconducting material comprises at least two materials wherein said materials are segregated as a core material and at least one shell material.

3. The device of claim 2, wherein said plurality of at least one dopant resides in one or more of said shell materials and is excluded from said core material.

4. The device of claim 2, wherein said plurality of at least one dopant resides in said core material and is excluded from said one or more of shell material.

5. The device of claim 1, wherein said plurality of each of said dopants comprises two to about 15 dopants.

6. The device of claim 1, wherein said semiconductor comprises a metal calcogenide or a metal pnictogenide.

7. The device of claim 1, wherein said dopant is Mn, Ni, Eu, Tb or other rare earth metal.

8. The device of claim 1, wherein said irradiation source is a laser.

9. The device of claim 1, further comprising a surface functional moiety.

10. The device of claim 9, wherein said surface functional moiety comprises an organic dye.

11. The device of claim 1, wherein said plurally doped semiconducting nanoparticles are embedded in a polymer matrix.

12. The device of claim 1, wherein said plurally doped semiconducting nanoparticles comprise plurally Mn-doped CdS/ZnS core/shell nanocrystals.

13. The device of claim 1, wherein said plurally doped semiconducting nanoparticles comprise plurally Mn-doped ZnSe/ZnS core/shell nanocrystals.

14. A method of emitting light comprising the steps of:
    providing at least one plurally doped semiconducting nanoparticle comprising at least one semiconducting material and a plurality of at least one dopant; and
    irradiating said plurally doped semiconducting nanoparticles with a controlled intensity of radiation, wherein said plurally doped semiconducting nanoparticles emit electromagnetic radiation at a plurality of wavelengths where the intensity of emission at the component wavelengths of said plurality of wavelengths depends on the intensity of said irradiation.

15. The method of claim 14, wherein said source of irradiation is a laser.

16. The method of claim 15, wherein said controlled intensity of irradiation comprises controlling the fluency of said laser.

* * * * *

UNITED STATES PATENT AND TRADEMARK OFFICE
CERTIFICATE OF CORRECTION

PATENT NO. : 8,410,455 B2  
APPLICATION NO. : 12/755820  
DATED : April 2, 2013  
INVENTOR(S) : Yunwei Charles Cao et al.

It is certified that error appears in the above-identified patent and that said Letters Patent is hereby corrected as shown below:

In the Specification

Column 2,  
Line 16, "in on of the shells" should read --in one of the shells--.  
Line 41, "1 show" should read --1 shows--.

Column 3,  
Line 9, "9 show" should read --9 shows--.  
Line 40, "shows a plots of" should read --shows plots of--.  
Line 65, "that that a" should read --that--.

Column 4,  
Lines 39-40, "incorporate a dyes" should read --incorporate dyes--.  
Line 41, "as long the" should read --as long as the--.

Column 8,  
Line 59, "formed was directly" should read --formed and was directly--.

In the Claims

Column 11,  
Line 20, "hand edge" should read --band edge--.

Signed and Sealed this  
Twentieth Day of August, 2013

Teresa Stanek Rea  
*Acting Director of the United States Patent and Trademark Office*